United States Patent
Guignard et al.

(10) Patent No.: US 11,316,605 B2
(45) Date of Patent: Apr. 26, 2022

(54) METHOD, DEVICE, AND COMPUTER PROGRAM FOR IMPROVING SYNCHRONIZATION OF CLOCKS IN DEVICES LINKED ACCORDING TO A DAISY-CHAIN TOPOLOGY

(71) Applicant: CANON KABUSHIKI KAISHA, Tokyo (JP)

(72) Inventors: Romain Guignard, Rennes (FR); Yacine El Kolli, Rennes (FR); Lionel Le Scolan, Rennes (FR); Arnaud Closset, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 16/465,518

(22) PCT Filed: Dec. 4, 2017

(86) PCT No.: PCT/EP2017/081389
§ 371 (c)(1),
(2) Date: May 30, 2019

(87) PCT Pub. No.: WO2018/104237
PCT Pub. Date: Jun. 14, 2018

(65) Prior Publication Data
US 2021/0288736 A1    Sep. 16, 2021

(30) Foreign Application Priority Data
Dec. 6, 2016    (GB) ..................................... 1620718

(51) Int. Cl.
*H04J 3/06*    (2006.01)
(52) U.S. Cl.
CPC .......... *H04J 3/0667* (2013.01); *H04J 3/0641* (2013.01)

(58) Field of Classification Search
CPC ...... H04J 3/0635; H04J 3/0638; H04J 3/0641; H04J 3/0667; H04J 3/0685; H04L 7/04; H04L 7/08; H04L 7/10
See application file for complete search history.

(56) References Cited

U.S. PATENT DOCUMENTS

| | | | |
|---|---|---|---|
| 7,817,758 B2 * | 10/2010 | Gao | .......................... G06F 1/12 375/354 |
| 7,880,861 B2 * | 2/2011 | Pouls | .................. G03F 7/70508 355/53 |

(Continued)

FOREIGN PATENT DOCUMENTS

WO    2016-092243 A1    6/2016

OTHER PUBLICATIONS

Precision Clock Synchronization Protocol for Networked Measurement and Control Systems, Geneva Switzerland, XP082001773, Feb. 2009, pp. 1-287.

*Primary Examiner* — Alpus Hsu
(74) *Attorney, Agent, or Firm* — Canon U.S.A., Inc. IP Division

(57) ABSTRACT

A method for synchronizing a logical clock in a device comprising a physical clock, an input port, and an output port, the device further comprising a logical clock and a time compensation clock sharing the physical clock, the time compensation clock making it possible to determine a residence time, comprising obtaining a theoretical residence time, during a pre-synchronization phase according to which the logical clock is not synchronized, adding a value representative of the obtained theoretical residence time to a residence time value stored in a synchronization message to be forwarded, during a synchronization phase according to which the logical clock is synchronized, obtaining a residence time and adding a value representative of the obtained residence time to a residence time value stored in a syn- (Continued)

chronization message to be forwarded, and synchronizing the logical clock as a function of a residence time value stored in a received synchronization message.

22 Claims, 5 Drawing Sheets

(56) References Cited

U.S. PATENT DOCUMENTS

| | | | | |
|---|---|---|---|---|
| 8,369,354 | B2* | 2/2013 | Guignard | H04J 3/0647 |
| | | | | 370/464 |
| 8,913,190 | B2* | 12/2014 | Closset | H04N 5/126 |
| | | | | 348/537 |
| 9,184,861 | B2* | 11/2015 | Aweya | H04J 3/0685 |
| 2014/0362872 | A1 | 12/2014 | Grenabo et al. | |
| 2016/0170439 | A1* | 6/2016 | Aweya | G06F 1/10 |
| | | | | 713/401 |

* cited by examiner

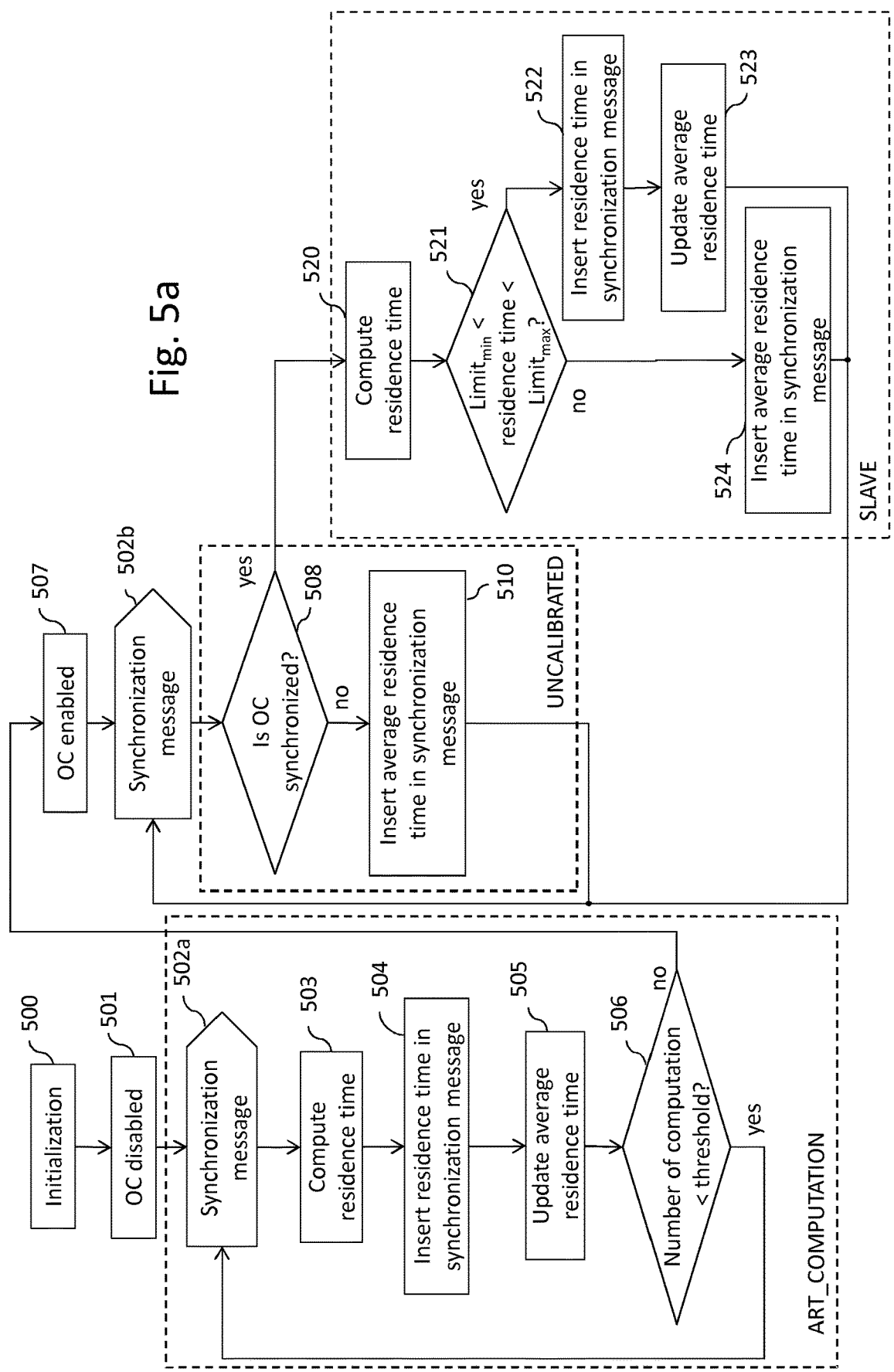

METHOD, DEVICE, AND COMPUTER PROGRAM FOR IMPROVING SYNCHRONIZATION OF CLOCKS IN DEVICES LINKED ACCORDING TO A DAISY-CHAIN TOPOLOGY

CROSS-REFERENCE TO RELATED APPLICATIONS

This application is the National Phase application of PCT Application No. PCT/EP2017/081389, filed on Dec. 4, 2017 and titled "Method, Device, And Computer Program For Improving Synchronization Of Clocks In Devices Linked According To A Daisy-Chain Topology" This application claims the benefit under 35 U.S.C. § 119(a)-(d) of United Kingdom Patent Application Nos. 1620718.5, filed on Dec. 6, 2016. The above cited patent applications are incorporated herein by reference in their entirety.

FIELD OF THE INVENTION

The present invention relates to the technical field of clock synchronization in network connected devices and more particularly to a method, a device, and a computer program for improving synchronization of clocks in devices linked according to a daisy-chain topology.

BACKGROUND OF THE INVENTION

Synchronization of devices connected to the same communication network is a real challenge, in particular in control systems comprising interconnected nodes that have to be synchronized with the same time reference. The time reference is generally provided by a master node having a high precision clock that may be obtained, for example, from a connection to an atomic clock or to a Global Positioning System (GPS).

The master node typically generates synchronization information related to its local clock (e.g. a frequency and/or a time of day) and sends this information to the other nodes (referred to as slave nodes) within synchronization messages or packets according to a clock synchronization protocol.

When a slave node receives synchronization information, it synchronizes the frequency and/or the time of day of its own clock as a function of that of the master node.

To that end, slave nodes may receive and send data for synchronization through a specific port, for example a port conforming to the precision time protocol (PTP) defined in the IEEE 1588-2008 protocol, as set forth in the document entitled "*IEEE Standard for a Precision Clock Synchronization Protocol for Networked Measurements and Control Systems*" by IEEE Instrumentation and Measurements Society, Jul. 24, 2008.

Other protocols exist for synchronizing nodes in communication networks such as the network time protocol (NTP).

FIG. 1 illustrates schematically an example of exchanges of synchronization messages between a master node and a slave node making it possible to synchronize a clock of the slave node as a function of a clock of the master node. It illustrates the main concept of the master-slave synchronization conforming to the IEEE 1588-2008 standard.

As illustrated, master node 100 sends a synchronization message or packet (Sync) referenced 101 to slave node 110 and generates a first timestamp denoted $t_1$ indicating the time at which master node 100 sent Sync message 101.

For the sake of clarity, it is considered below that in the context of the invention there is no meaningful difference between synchronization messages and synchronization packets.

According to a "one-step clock" mechanism, first timestamp $t_1$ is sent to the slave node 110 within Sync message 101. Alternatively, according to a "two-step clock" mechanism and as illustrated in FIG. 1, first timestamp $t_1$ is sent to slave node 110 within a following message (Follow-Up) referenced 102 that is sent by master node 100 to slave node 110 after Sync message 101.

Upon reception of Sync message 101, slave node 110 generates a second timestamp denoted $t_2$ indicating the time at which slave node 110 received Sync message 101. Next, slave node 110 sends a request message to master node 100 (Delay_Req) referenced 103, making it possible to compute a transmission delay. When sending Delay_Req message 103, slave node 110 generates a third timestamp denoted $t_3$ indicating the time at which slave node 110 sends this message.

Upon reception of Delay_Req message 103, master node 100 generates a fourth timestamp denoted $t_4$ indicating the time at which it receives this message. This timestamp is sent to slave node 110 within a request response message (Delay_Resp) referenced 104.

After having received Delay_Resp message 104, the four timestamps $t_1$, $t_2$, $t_3$, and $t_4$ are available at slave node 110. They can be used to compute the offset of the slave node clock with regard to the master node clock and a path delay:

$$\text{offset} = \frac{(t_2 - t_1) - (t_4 - t_3)}{2}$$

$$\text{delay} = \frac{(t_2 - t_1) + (t_4 - t_3)}{2}$$

The offset is the difference between the time of the slave node and a reference time or true time of a master node that may be given by the master node clock (or one of the master node clocks if it comprises several clocks).

The path delay is the delay associated with the path connecting the master node to the slave node. To compute the path delay, two delay measurements are made: the forward time delay from the master node to the slave node ($t_2 - t_1$) and the reverse time delay from the slave node to the master node ($t_4 - t_3$). The path delay is the average of the forward and reverse time delay.

Based on the offset and path delay, slave node 110 is able to synchronize the frequency and the time of day of its local clock to those of master node 100. According to the IEEE 1588-2008 protocol, it is possible to achieve millisecond synchronization accuracy or better according to the timestamp precision.

The exchange of messages illustrated in FIG. 1 is typically periodically repeated so as to synchronize continuously the slave node clock.

A slave node clock locked to a master node clock, as described previously, is known as an ordinary clock (OC). The synchronization mechanism may be referred to as an ordinary clock module or more generally a logical clock module.

The synchronization mechanism described by reference to FIG. 1 is very efficient for point to point connection between a master node and a slave node.

However, in a communication network wherein the different nodes are mostly interconnected through router or switch devices, the latter introduce time delay variation on the packet delivery according to the network traffic conditions.

Typically, when a node of a communication network receives a packet through an ingress physical interface, it stores the packet in an ingress FIFO memory (First In/First Out memory), next it processes it in the node and stores it in an egress FIFO memory so that it can be transmitted through an egress physical interface. Accordingly, the packet spends a non-predictable residence time in the node (in the ingress FIFO, in the processing unit, and then in the egress FIFO). This unpredictable time delay variation is particularly critical for synchronization messages since it prevents the slave nodes from retrieving synchronization information from the master node with a high accuracy. Thus, the master-slave synchronization suffers from this unpredictable delay variation.

In response to this problem, the clock synchronization mechanism defined in the IEEE 1588-2008 standard uses a time compensation clock mechanism called transparent clock (TC).

The ordinary clock and the transparent clock are both clock elements of the slave nodes.

The transparent clock module measures the residence time of the synchronization messages (e.g. Sync message 101 and Delay_Req message 103) within the node. This makes it possible for each slave node to synchronize its clock with that of the master node by taking into account the residence times of the synchronization messages within the nodes of the communication network. In other words, the use of the measured residence times makes the aforementioned unpredictable delay variation predictable.

According to this clock synchronization mechanism, a node generates an ingress timestamp upon reception of a synchronization message and generates an egress timestamp when it transmits this synchronization message. The residence time of the synchronization message within the node is then computed as the difference between the egress timestamp and the ingress timestamp.

According to the IEEE 1588-2008 protocol, the residence time is accumulated in a dedicated part of the synchronization messages, known as the Correction Field, when the synchronization messages are transmitted from one node to another.

When the "one-step clock" mechanism is used, the computed residence time is embedded in the synchronization messages (e.g. Sync message 101 or Delay_Req message 103) before the synchronization messages are forwarded. More precisely, it is added to the residence time of the synchronization messages that is equal to zero if the synchronization messages are directly received from the master node (or if there is no time delay resulting from the previous nodes) or to the residence times of the previous nodes. Alternatively, when the "two-step clock" mechanism is used, the computed residence time is used to update the correction field of the subsequent synchronization messages (e.g. either Follow-Up message 102 or Delay_Resp message 104 respectively for Sync message 101 or Delay_Req message 103).

Such a transparent clock module may be implemented based on one of the three following schemes.

In a first implementation corresponding to a free running mode, the residence time error is equal to the clock drift during residence that is to say the frequency difference between the slave clock rate and the master clock rate.

In a second implementation corresponding to a frequency correction, known as syntonization, without physical clock adjustment, the ratio between the master clock rate and the node clock rate is estimated and a correction to the calculated residence time (called digital implementation of the syntonization) is applied.

The third implementation is directed to a syntonization with physical clock adjustment. According to this implementation, the node physical clock is modified to adhere to the master clock rate (it is called the analog implementation of the syntonization).

In these implementations, there is no adjustment of the time of day.

In distributed control applications, it is appropriate to use a daisy-chain network topology due to simplified wiring requirements. In this kind of topology, each node of the communication network acts at the same time as an end device and as a switch device. Accordingly, from an IEEE 1588-2008 point of view, each node combines a transparent clock (or a clock having similar properties) for handling switching functionalities and an ordinary clock (or a clock having similar properties) for synchronization of the node (i.e. when it is considered as an end device).

If both functionalities are independent, the ordinary clock and the transparent clock use independent hardware clocks to perform their own functions. Alternatively, both functionalities may share the same physical clock which is convenient since most of the network adapter boards own only one physical clock per physical interface or one physical clock for all the physical interfaces. Furthermore, using different physical clocks per physical interface would imply not only duplicating the necessary resources (several PTP stacks, several timestamping modules, etc.) but also a complexity rise of the PTP management. In addition, IEEE1588-2008 standard advises sharing a common physical clock for combined ordinary and transparent clocks.

FIG. 2 illustrates an example of a system comprising nodes connected according to the daisy-chain topology, each of the nodes implementing both an ordinary clock and a transparent clock. For the sake of illustration, only four nodes are represented, one master node and three slave nodes.

The master node also called the grand master (GM) and referenced 200 comprises an ordinary clock denoted OC-0 that is to be used as a reference clock for synchronization of the slave node clocks. Each of the slave nodes (S) referenced 210, 220, and 230 comprises an ordinary clock (OC) referenced 211, 221, and 231, respectively, that should be synchronized with the grand master clock, and a transparent clock (TC) referenced 212, 222, and 232, respectively, that is in charge of computing the residence time and of inserting it in the forwarded synchronization messages (e.g. Sync message 101 or Delay_Req message 103 coming from the master node or from the slave nodes).

The nodes are linked to each other according to daisy-chain links referenced 201, 202, and 203. Therefore, the ordinary clock of slave node 211 is synchronized using synchronization messages directly received from grand master 200, the ordinary clock of slave node 221 is synchronized using synchronization messages received from grand master 200 via slave node 210, updated by transparent clock 212 of slave node 210 (insertion of the residence time in the Correction Field), and the ordinary clock of slave node 231 is synchronized using synchronization messages received from grand master 200 via slave nodes 210 and 220, updated by transparent clocks 212 and 222 of slave nodes 210 and 220, respectively.

FIG. 3 schematically illustrates a state machine illustrating an example of a synchronization process carried out in a slave node to synchronize its ordinary clock. It corresponds to the IEEE 1588-2008 standard. For the sake of illustration, only main states (in the meaning of IEEE 1588-2008 standard) of the ordinary clock of the slave node are represented (PTP port states being represented as rectangles).

As illustrated with reference 300, a first state of the PTP port is INITIALIZING. It corresponds to the internal initialization of the slave node (internal data setting, setting of communication modules, etc.). INITIALIZING state 300 ends when an INITIALIZE event referenced 301 occurs meaning that all the internal parameters have been initialized.

Next, the slave node enters the LISTENING state referenced 310 during which the slave node waits for an Announce message or a message giving information regarding the master node to be selected for synchronization purposes. Upon reception of the Announce message or of an equivalent message, the slave node goes to the UNCALIBRATED state referenced 320 through transition RS_SLAVE 302.

The UNCALIBRATED state can be considered as a pre-synchronization state according to which the slave node starts receiving synchronization messages and applies clock corrections accordingly.

Once the slave node is synchronized with the selected master node clock, the slave node goes to the SLAVE state referenced 330 through the MASTER_CLOCK_SELECTED transition event referenced 304. From this state 330, the slave node can go back to UNCALIBRATED state 320 either if a new master node is selected as illustrated with reference 305 (i.e. the new selected master node is different from the previously selected master node) or in the case of synchronization problems as illustrated with SYNCHRONIZATION_FAULT event 303.

Although such a system may prove to be efficient, it has been observed that the combination of an ordinary clock and of a transparent clock leads to difficulties in particular circumstances, in particular during the calibration phase of the ordinary clock (corresponding to the UNCALIBRATED state).

According to the IEEE 1588-2008 standard, the UNCALIBRATED state is defined as follows: "This is a transient state to allow initialization of synchronization servos, updating of data sets when a new master port has been selected, and other implementation-specific activity.".

In practice, the slave node applies rough corrections to synchronize its local clock with the selected master clock during the calibration stage. However, these huge corrections to the physical clock introduce errors in the residence time computation by modifying the time of day while a synchronization message (e.g. Sync message 101 and Delay_ Req message 103) is in transition or by using different clock values for ingress and egress timestamping.

As explained above, the residence time is directly involved for the offset and path delay computation. Therefore, error in the residence time computation introduces inaccuracy in the offset and path delay computation for the following nodes.

As a consequence, a node can reliably synchronize its ordinary clock only when the clocks of the previous nodes are synchronized. Thus, the time duration needed for synchronizing the nodes increases from one node to another.

Furthermore, since the slave nodes initialize their synchronization servos (servos being devices for maintaining a "position" according to an instruction, typically in IEEE 1588 a servo is implemented with a proportional integral derivative (PID) algorithm, a PID controller being a control loop feedback mechanism) during the calibration phase, they may be unable to converge and synchronize due to meaningless values of synchronization messages or packets. The convergence time greatly depends on the accuracy of the first values.

Accordingly, there is a need for controlling and improving the behaviour of the combination of an ordinary clock and of a transparent clock during the calibration phase of the ordinary clock at start-up or when a recalibration occurs, for example after a loss or a change of master node.

SUMMARY OF THE INVENTION

The present invention has been devised to address one or more of the foregoing concerns.

In this context, there is provided a solution for improving clock synchronization in cascaded devices, for example in devices linked according to a daisy-chain topology.

According to a first object of the invention, there is provided a method for synchronizing a logical clock module in a device for a node to be used in a system comprising cascaded nodes, the device comprising a physical clock, an input port, and an output port, the device further comprising a logical clock module and a time compensation clock module, the logical clock module and the time compensation clock module sharing the physical clock, the time compensation clock module making it possible to determine a residence time representing the time needed for a synchronization message received from the input port to be output via the output port, the method comprising:

obtaining a theoretical residence time;

during a pre-synchronization phase according to which the logical clock module is not synchronized, adding a value representative of the obtained theoretical residence time to a residence time value stored in a synchronization message to be forwarded, during a synchronization phase according to which the logical clock module is synchronized, obtaining a residence time and adding a value representative of the obtained residence time to a residence time value stored in a synchronization message to be forwarded, and synchronizing the logical clock module as a function of a residence time value stored in a received synchronization message.

Therefore, the method of the invention makes it possible to optimize synchronization of clocks in cascaded nodes, in particular regarding the time duration needed for synchronizing the nodes. It is compatible with the precision time protocol defined in IEEE 1588 and makes it possible to avoid duplicating the precision time protocol stack and the physical clock in the logical clock module and in the time compensation clock module.

In an embodiment, the step of obtaining a theoretical residence time comprises a step of disabling synchronization of the logical clock module and a step of computing an average residence time, so that the theoretical residence time is computed taking into account the current state of the system, the theoretical residence time being therefore more accurate than an offline determined theoretical residence time. The average residence time may be computed according to an algorithm based on arithmetic average, on moving average, on weighted mean, or on root mean square.

In an embodiment, the average residence time is computed based on a predetermined number of processed received synchronization messages, giving the opportunity of mastering the time duration allocated to compute the default residence time.

In an embodiment, the step of obtaining a theoretical residence time comprises a step of obtaining a predetermined theoretical residence time so that the method may be easily implemented. The theoretical residence time can be determined so as to match the most common use cases.

In an embodiment, the predetermined theoretical residence time is obtained as a function of an item of information directed to the workload of communication links connecting the cascaded nodes. Still in an embodiment, the method further comprises a step of computing a plurality of theoretical residence times, each theoretical residence time of the plurality of theoretical residence times being associated with particular communication conditions.

Accordingly, the theoretical residence time may be computed and/or determined taking into account the current state of the system, the theoretical residence time to be used being therefore more accurate than a predetermined theoretical residence time.

In an embodiment, the theoretical residence time is obtained from another node through a received message so that the method may be easily implemented.

In an embodiment, a value representative of the obtained theoretical residence time is added to a residence time value of a received synchronization message for updating the received synchronization message that is forwarded afterward.

Accordingly, the method of the invention makes it possible to optimize synchronization of clocks in cascaded nodes, in particular regarding the time duration needed for synchronizing the nodes.

In an embodiment, the method further comprises a step of updating the obtained theoretical residence time as a function of a computed residence time so that the theoretical residence time is updated on a regular basis and thus, its accuracy is improved.

In an embodiment, the method further comprises a step of comparing the obtained residence time with at least one threshold, wherein the value representative of the obtained theoretical residence time is added to a residence time value stored in a synchronization message to be forwarded, instead of a value representative of the obtained residence time, during the pre-synchronization phase, as a result of the comparison, so as to decrease the time duration needed for synchronizing the nodes.

In an embodiment, the step of updating the obtained theoretical residence time is carried out as a function of the comparison, so as to improve the accuracy of the theoretical residence time and to decrease the time duration needed for synchronizing the nodes.

In an embodiment, the cascaded nodes are connected according to a daisy-chain topology.

According to a second object of the invention, there is provided a synchronization device for a node in a system comprising cascaded nodes, the synchronization device comprising a microprocessor, a physical clock, an input port, and an output port, the synchronization device further comprising a logical clock module and a time compensation clock module, the logical clock module and the time compensation clock module sharing the physical clock, the time compensation clock module making it possible to determine a residence time representing the time needed for a synchronization packet received from the input port to be transmitted via the output port, the microprocessor being configured for carrying out steps of synchronization of the logical clock module according to a master node clock, the steps of synchronization comprising:

obtaining a theoretical residence time;

during a pre-synchronization phase according to which the logical clock module is not synchronized, adding a value representative of the obtained theoretical residence time to a residence time value stored in a synchronization message to be forwarded, during a synchronization phase according to which the logical clock module is synchronized, obtaining a residence time and adding a value representative of the obtained residence time to a residence time value stored in a synchronization message to be forwarded, and synchronizing the logical clock module as a function of a residence time value stored in a received synchronization message Therefore, the device of the invention makes it possible to optimize synchronization of clocks in cascaded nodes, in particular regarding the time duration needed for synchronizing the nodes. It is compatible with the precision time protocol defined in IEEE 1588 and makes it possible to avoid duplicating the precision time protocol stack and the physical clock in the logical clock module and in the time compensation clock module.

In an embodiment, the microprocessor is further configured so that the step of obtaining a theoretical residence time comprises a step of disabling synchronization of the logical clock module and a step of computing an average residence time, so that the theoretical residence time is computed taking into account the current state of the system, the theoretical residence time being therefore more accurate than an offline determined theoretical residence time. The average residence time may be computed according to an algorithm based on arithmetic average, on moving average, on weighted mean, or on root mean square.

In an embodiment, the microprocessor is further configured so that the average residence time is computed based on a predetermined number of processed received synchronization messages, giving the opportunity of mastering the time duration allocated to compute the default residence time.

In an embodiment, the microprocessor is further configured so that the step of obtaining a theoretical residence time comprises a step of obtaining a predetermined theoretical residence time so that the method carried out by the microprocessor may be easily implemented within the latter. The theoretical residence time can be determined so as to match the most common use cases.

In an embodiment, the microprocessor is further configured for carrying out a step of computing a plurality of theoretical residence times, each theoretical residence time of the plurality of theoretical residence times being associated with particular communication conditions.

Accordingly, theoretical residence times may be computed taking into account the current state of the system, the theoretical residence time to be used being therefore more accurate than a predetermined theoretical residence time.

In an embodiment, the microprocessor is further configured so that the theoretical residence time is obtained from another node through a received message so that the method carried out by the microprocessor may be easily implemented within the latter.

In an embodiment, the microprocessor is further configured so that a value representative of the obtained theoretical residence time is added to a residence time value of a received synchronization message for updating the received synchronization message that is forwarded afterward.

Accordingly, the device of the invention makes it possible to optimize synchronization of clocks in cascaded nodes, in particular regarding the time duration needed for synchronizing the nodes.

In an embodiment, the microprocessor is further configured for carrying out a step of updating the obtained theoretical residence time as a function of a computed residence time so that the theoretical residence time is updated on a regular basis and thus, its accuracy is improved.

In an embodiment, the microprocessor is further configured for carrying out a step of comparing the obtained residence time with at least one threshold, wherein the value representative of the obtained theoretical residence time is added to a residence time value stored in a synchronization message to be forwarded, instead of a value representative of the obtained residence time, during the pre-synchronization phase, as a result of the comparison, so as to decrease the time duration needed for synchronizing the nodes.

In an embodiment, the microprocessor is further configured so that the step of updating the obtained theoretical residence time is carried out as a function of the comparison, so as to improve the accuracy of the theoretical residence time and to decrease the time duration needed for synchronizing the nodes.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIGS. 5a and 5b, illustrates steps of examples of algorithms carried out at a node level, according to particular embodiments of the invention;

DETAILED DESCRIPTION OF EMBODIMENTS OF THE INVENTION

According to particular embodiments, the invention is directed to a synchronization mechanism for devices implementing a combination of a logical clock module used for synchronization purposes, for example an ordinary clock module in the broad meaning of the IEEE 1588-2008 standard, and of a time compensation clock module used for bridging purposes, for example a transparent clock module (still in the broad meaning of the IEEE 1588-2008 standard), where the logical clock module and the time compensation clock module share the same physical clock, using a theoretical residence time that may be predetermined or computed.

Still according to particular embodiments, start-up of the logical clock module synchronization is delayed so as to compute an average residence time while the physical clock is in a free running mode or is subject to an analog or a digital syntonization. The average residence time is advantageously used during synchronization of the logical clock module. Next, after having synchronized the logical clock module, the residence time is computed and the average residence time may be updated.

This makes it possible to improve the convergence time of the synchronization process that is to say to decrease the time duration for all the slave nodes to synchronize their clock with that of a master node.

For the sake of illustration, it is considered in the following that a logical clock module is an ordinary clock module and that a time compensation clock module is a transparent clock module, according to the IEEE 1588-2008 standard. However, it is to be understood that the invention is not limited to the IEEE 1588-2008 standard and thus, that a logical clock module is not limited to an ordinary clock module and that a time compensation clock module is not limited to a transparent clock module.

Figure 4:
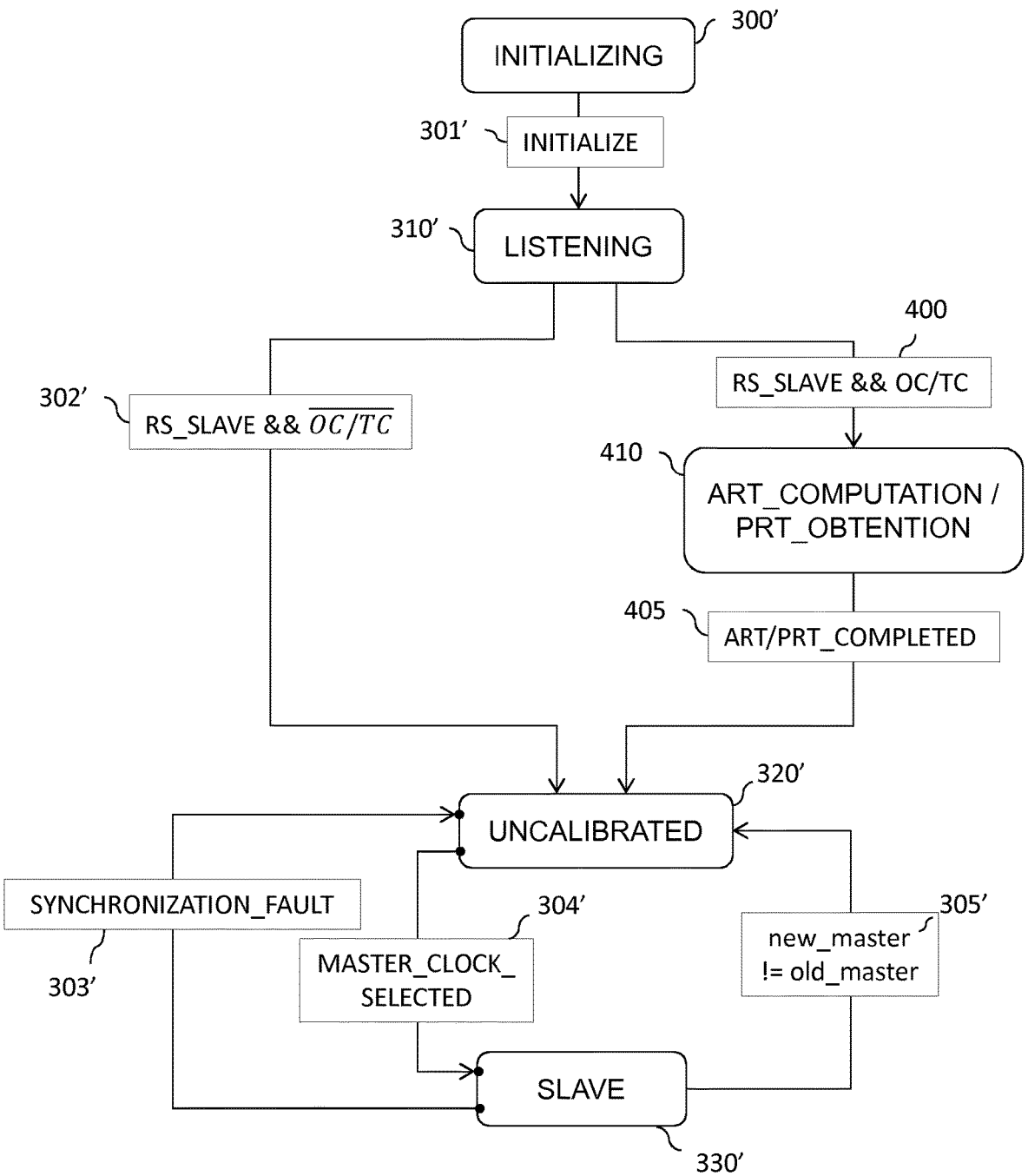
FIG. 4 schematically represents a state machine illustrating an example of a synchronization process carried out in a slave node according to embodiments of the invention.

FIG. 4 schematically represents a state machine illustrating an example of a synchronization process carried out in a slave node according to embodiments of the invention.

Figure 3:
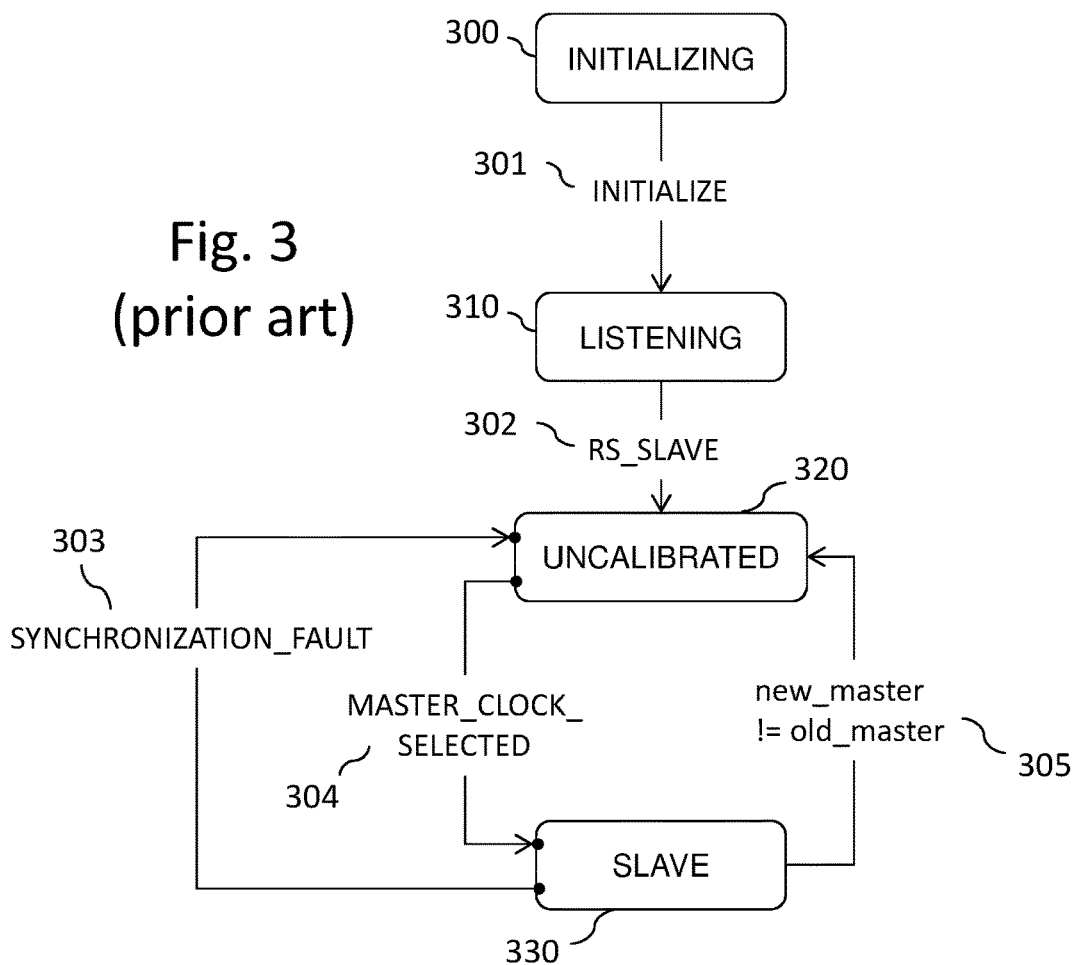
FIG. 3 schematically represents a state machine illustrating an example of a synchronization process carried out in a slave node to synchronize its ordinary clock.

For the sake of illustration, it corresponds to the IEEE 1588-2008 standard and, as illustrated in FIG. 3, only main states (in the meaning of IEEE 1588-2008 standard) of the ordinary clock module of the slave node are represented (PTP port states still being represented as rectangles).

As illustrated with reference 300', a first state of the PTP port is INITIALIZING. This corresponds to the internal initialization of the slave node (internal data setting, setting of communication modules, etc.). INITIALIZING state 300' ends when an INITIALIZE event referenced 301' occurs meaning that all the internal parameters have been initialized.

Next, the slave node goes to the LISTENING state referenced 310' during which the slave node waits for an Announce message or a message giving information regarding the master node to be selected for synchronization purposes. Upon reception of the Announce message or of an equivalent message and of the RS_SLAVE event referenced 302' and if the considered node does not comprise a combination of an ordinary clock module and a transparent clock module (OC/TC), the slave node goes to the UNCALIBRATED state referenced 320'.

Again, the UNCALIBRATED state can be considered as a pre-synchronization state according to which the slave node starts receiving synchronization messages and applies clock corrections accordingly. Once the slave node is synchronized with the selected master node clock, the slave node goes to the SLAVE state referenced 330' through the MASTER_CLOCK_SELECTED transition event referenced 304'. From this state 330', the slave node can go back to UNCALIBRATED state 320' either if a new master node is selected as illustrated with reference 305' (i.e. the new selected master node is different from the previously selected master node) or in the case of a synchronization problem as illustrated with SYNCHRONIZATION_FAULT event 303'.

As illustrated, a new state 410 denoted ART_COMPUTATION/PRT_OBTENTION is added, in comparison with the state machine illustrated in FIG. 3, for computing an average residence time or obtaining a predetermined residence time, generically referred to as a theoretical residence time in the following. It takes place between LISTENING state 310' and UNCALIBRATED state 320'. Accordingly, when the slave node goes out of LISTENING state 310', it goes either to state 320' as mentioned above or to ART_COMPUTATION/PRT_OBTENTION state 410 upon reception of the Announce message or of a similar message through the RS_SLAVE transition referenced 302' and if the considered node comprises a combination of an ordinary clock module and a transparent clock module (OC/TC condition referenced 400). For the sake of illustration, the OC/TC condition (combination of an ordinary clock module and of a transparent clock module) may be set during the INIZIALIZING state or defined as a configuration parameter.

According to particular embodiments, steps 502a to 506 described by reference to FIG. 5a are carried out during state 410 for computing an average residence time (ART), based on residence time values computed by the transparent clock module according to a standard method.

Still according to particular embodiments, one or more predetermined residence times may be obtained during initialization (state 300').

Once a theoretical residence time has been obtained (e.g. the average residence time has been computed or at least one predetermined residence time has been obtained), the ART/PRT_COMPLETED event referenced 405 is generated and the slave node goes to UNCALIBRATED state 320'.

As explained above, a huge correction may be applied to the physical clock used for the timestamping of the ingress and egress synchronization messages during the calibration phase. These corrections may lead to errors in the computation of the residence time when they occur while a synchronization message is in transition in the node (i.e. when a clock correction is made between the ingress and the egress timestamping).

It is to be recalled that an error in a residence time value has consequences for the subsequent nodes (in the daisy-chain) receiving a synchronization message comprising this value in its correction field since these subsequent nodes use the received residence time value for computing their delay and offset for synchronization purposes.

To prevent the use of erroneous residence time values during UNCALIBRATED state 320' (i.e. after a theoretical residence time has been obtained if the node comprises a combination of an ordinary clock module and of a transparent clock module), the transparent clock module uses the theoretical residence time instead of the computed residence time.

More specifically, if the "one-step clock" mechanism is used, the transparent clock module inserts the theoretical residence time in the correction field of a received synchronization message (e.g. Sync message 101 or Delay_Req message 103) instead of the computed residence time. Similarly, if the "two-step clock" mechanism is used, the transparent clock module inserts the theoretical residence time in the correction field of subsequent messages relative to synchronization messages (e.g. Follow-Up message 102 or Delay_Resp message 104).

For the sake of clarity, synchronization messages in the meaning of the "one-step clock" mechanism and subsequent messages relative to synchronization messages in the meaning of the "two-step clock" mechanism are generically referred to as synchronization messages in the following.

The computed residence times or the theoretical residence times are accumulated nodes after nodes in the correction field of the synchronisation messages as defined by the IEEE 1588-2008 standard.

At the end of the calibration phase, the slave node goes to SLAVE state 330'. This steady state allows the master-slave synchronization to be maintained with smooth corrections by the ordinary clock module.

In this state and upon reception of a synchronization message, the transparent clock module computes the residence time and inserts it in the correction field of the synchronization message according to the one or two step configuration. According to embodiments, the computed residence time is also used to update the average residence time which may be used later if the slave node goes back in UNCALIBRATED state 320' either because a new master node is selected (as illustrated with reference 305') or in the case of a synchronization fault (as illustrated with reference 303).

Keeping the average residence time up to date may avoid going anew to ART_COMPUTATION/PRT_OBTENTION state 410.

Figure 5B:
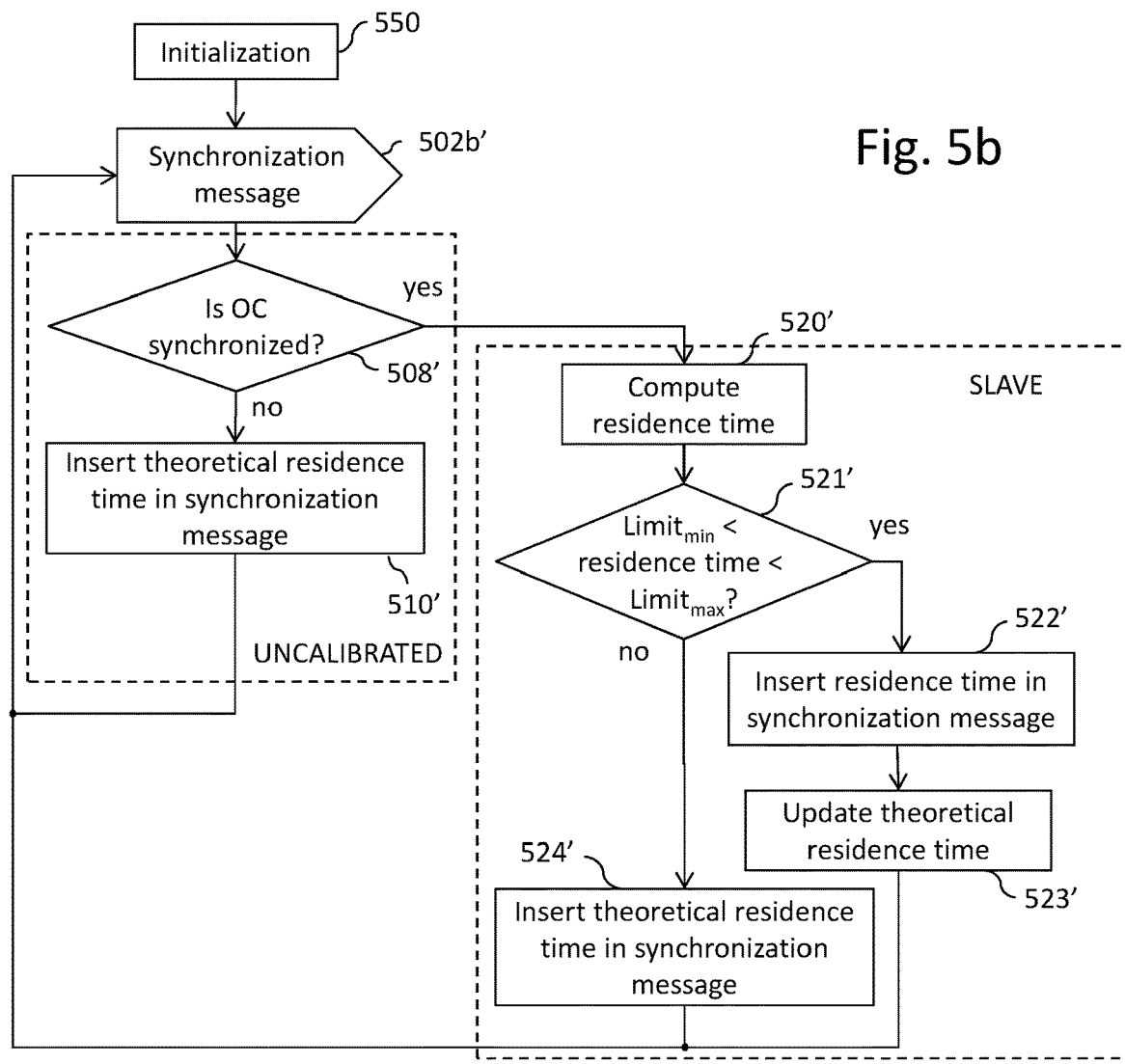

FIGS. 5a and 5b, illustrates steps of examples of algorithms carried out at a node level, according to particular embodiments of the invention.

FIG. 5a illustrates steps associated with the ART_COMPUTATION, UNCALIBRATED, and SLAVE states described in reference to FIG. 4.

For the sake of illustration, this algorithm is directed to the free running mode of the transparent clock module of the node. However, the invention may support other implementations of the transparent clock module such as the digital or analog syntonization.

As illustrated, a first step is directed to the initialization (step 500). For example, it may comprise the initialization of internal variables and communication setup with other nodes. It corresponds to INITIALIZING and LISTENING states 300' and 310' in FIG. 4.

Next, the ordinary clock module is partially disabled (step 501) so that no correction is done by the ordinary clock module on the physical clock of the node.

Next, upon detection of an event indicating the reception of a synchronization message (e.g. Sync message 101 or Delay_Req message 103), referenced 502a, the node computes a residence time based on the timestamps of the synchronization message at the ingress and egress ports (step 503).

The computed residence time is then inserted in the synchronization message (step 504) and used for updating the average residence time (step 505).

In a following step (step 506). It is determined whether or not the node has processed enough samples for the average residence time to be reliable. This can be done by comparing the number of processed samples (e.g. the number of processed synchronous messages) with a threshold. If the number of processed samples is too low, the previous steps (steps 502a to 506) are repeated in order to acquire and process new samples.

On the contrary, if the number of processed samples is equal to or greater than the threshold, the ordinary clock module is enabled (step 507) so that the physical clock may be corrected if needed.

Upon detection of an event indicating the reception of a synchronization message (e.g. Sync message 101 or Delay_Req message 103), referenced 502b, a test is performed (step 508) to determine whether or not the ordinary clock is synchronized (i.e. the node is in the SLAVE state) or not (i.e. the node is in the UNCALIBRATED state).

If the ordinary clock is not synchronized, a theoretical residence time corresponding to the average residence time is inserted in the correction field of the synchronization message instead of a computed residence time (step 510). It may comprise the step of inserting the theoretical residence time or a value representing the theoretical residence time in the correction field of the synchronization message. It may also comprise the step of adding the theoretical residence time or a value representing the theoretical residence time to a value (that can be zero) already stored in the correction field of the synchronization message.

On the contrary, if the ordinary clock is synchronized, a residence time is computed (step 520) and a test is preferably performed (step 521) to check whether the residence time computed in the step 520 is comprised between a high and a low limit value. This test makes it possible to filter the abnormal values which may be obtained although the ordinary clock is synchronized. For instance, the low limit value denoted $limit_{min}$ may be set to 0 in order to filter the negative values. However, the low limit is preferably defined according to a minimum theoretical time for a packet to traverse the node from the ingress to the egress port.

The high limit value denoted $limit_{max}$ may be set, for example, to n time the theoretical residence time (e.g. n=100) or to a maximum theoretical time corresponding, for example, to the timeout value for the synchronization messages (e.g. the timeout of the reception of announce message).

If the computed residence time is comprised between the high and the low limit value, the residence time is inserted in the correction field of the synchronization message (step 522), and used to update the average residence time that may be used later (step 523).

Again, inserting the residence time in the correction field of the synchronization message may comprise the step of inserting the residence time or a value representing the residence time in the correction field of the synchronization message and may also comprise the step of adding the residence time or a value representing the residence time to a value (that can be zero) already stored in the correction field of the synchronization message.

On the contrary, if the residence time is not comprised between the high and the low limit value, the theoretical residence time corresponding to the average residence time is inserted in the correction field of the synchronization message instead of a computed residence time (step 524) like in step 510.

After having inserted the theoretical residence time in the correction field of the synchronization message (step 510 or step 524) or having updated the average residence time (step 523), the process is branched to step 502b to process a new synchronization message.

In order to reduce the time needed for computing the average residence time, the time frequency at which synchronization messages are transmitted may be increased. Hence, the average residence time is computed faster since the period of time for processing the same number of samples, as checked in test 506, is lower.

According to another solution for reducing the time needed for computing the average residence time, a theoretical residence time is computed offline for each of different profiles of traffic load (e.g. no traffic except synchronization messages, normal traffic, and heavy traffic) since the traffic load has a direct effect on the duration of the residence time. Then, during the calibration phase, the theoretical residence time corresponding to the current traffic load may be used.

In order to evaluate the current traffic load, the system may accumulate the size of each of the received packets for a given period of time (for example in between two successive synchronization messages to take benefit of the accuracy of the timestamping to compute the period duration) and thus, compute a bit rate for this period. More precisely, it may consist in accumulating the size of the packets received on each port of the L2 bridge 720 in FIG. 7, i.e. the external ports of the node (e.g. ports 731a and 731b in FIG. 7) and its internal port (e.g. the interface between application layer 710 and L2 bridge block 720 in FIG. 7). It is to be noted that a RX timestamp is generated each time a synchronization packet is received. Therefore, by calculating the difference between the RX timestamps of two successive synchronization packets a very accurate value of the time elapsed between reception of the two synchronization packets may be obtained.

This value of traffic load may be compared with a threshold in order to choose a suitable theoretical residence time. An example of value of threshold to discriminate between a low traffic and a normal traffic could be 20% of the bridge capacity and a value of threshold to discriminate between a normal traffic and a heavy traffic could be 80% of the bridge capacity. The bridge capacity may be defined as the sum of incoming traffic (e.g. incoming traffic at the level of L2 bridge block 720 in FIG. 7). The theoretical residence time may be re-evaluated for each new traffic load computation which may match the reception of a new synchronization message.

Hereby, the theoretical residence time is immediately available. The different theoretical residence times corresponding to the traffic loads may be made available by factory settings. Such predetermined residence times may be stored locally within the nodes.

Such an embodiment is illustrated in FIG. 5b in which one or several theoretical residence times (i.e. residence times computed offline as described above) are retrieved, for example during initialization step 550. These theoretical residence times may be set to predetermined values or computed off-line.

The other steps (i.e. steps 502b', 508', 510', 520', 521', 522', 523', and 524') of FIG. 5b are similar to the corresponding steps in FIG. 5a.

To perform an offline computation of a theoretical residence time, the same steps as those described with reference to the ART_COMPUTATION state in FIG. 5a (i.e. steps 502a, 503, 504, 505, and 506) can be carried out.

It has been observed that there exist environments wherein the traffic is similar in each bridge or switch embedded in each node. As a consequence, each node may compute the average residence time by using the residence times computed by previous nodes. According to another embodiment, a first node computes an average residence time that is transmitted and used by the subsequent nodes. Such an average residence time obtained from another node may be received within an additional field of a synchronization message or within a message that is not a synchronization message.

The average residence time (as computed in step 503) may be calculated according to different algorithms based, for example on arithmetic average, moving average, weighted mean, root mean square, or others.

Furthermore, it is to be noted that the algorithm used for computing an initial average residence time (as illustrated with step 505 in FIG. 5a) may be different from the one used for updating the average residence time (as illustrated with steps 523 and 523' in FIG. 5a and FIG. 5b, respectively).

For the sake of illustration, the initial average residence time can be computed with the arithmetic average and the update can be based on a moving average in order to keep a history of the values with a time limit since the residence time depends on the traffic load. Still for the sake of illustration, a reset of the moving average window can be carried out upon detection of a meaningful change in the traffic load.

Figure 1:
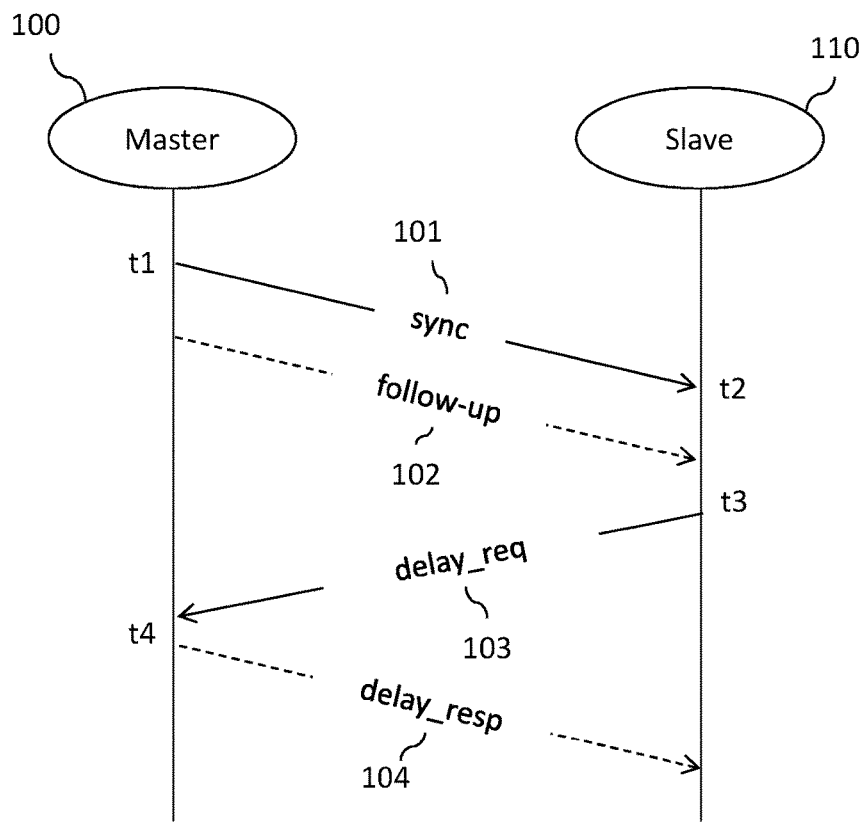
FIG. 1 illustrates schematically an example of exchanges of synchronization messages between a master node and a slave node making it possible to synchronize a clock of the slave node as a function of a clock of the master node.
Figure 2:
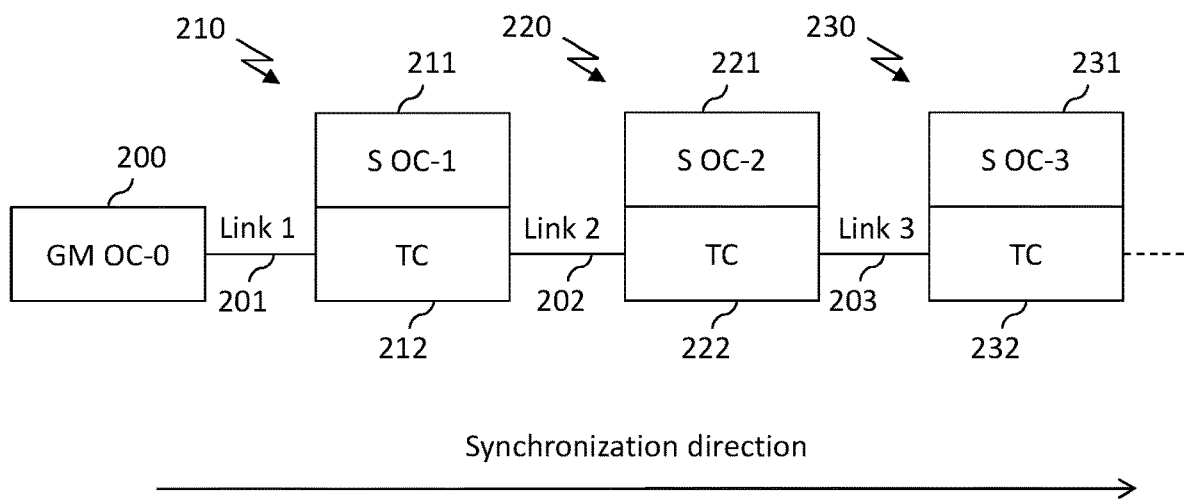
FIG. 2 illustrates an example of a system comprising nodes connected according to a daisy-chain topology, each of the nodes implementing both an ordinary clock and a transparent clock.
Figure 6:
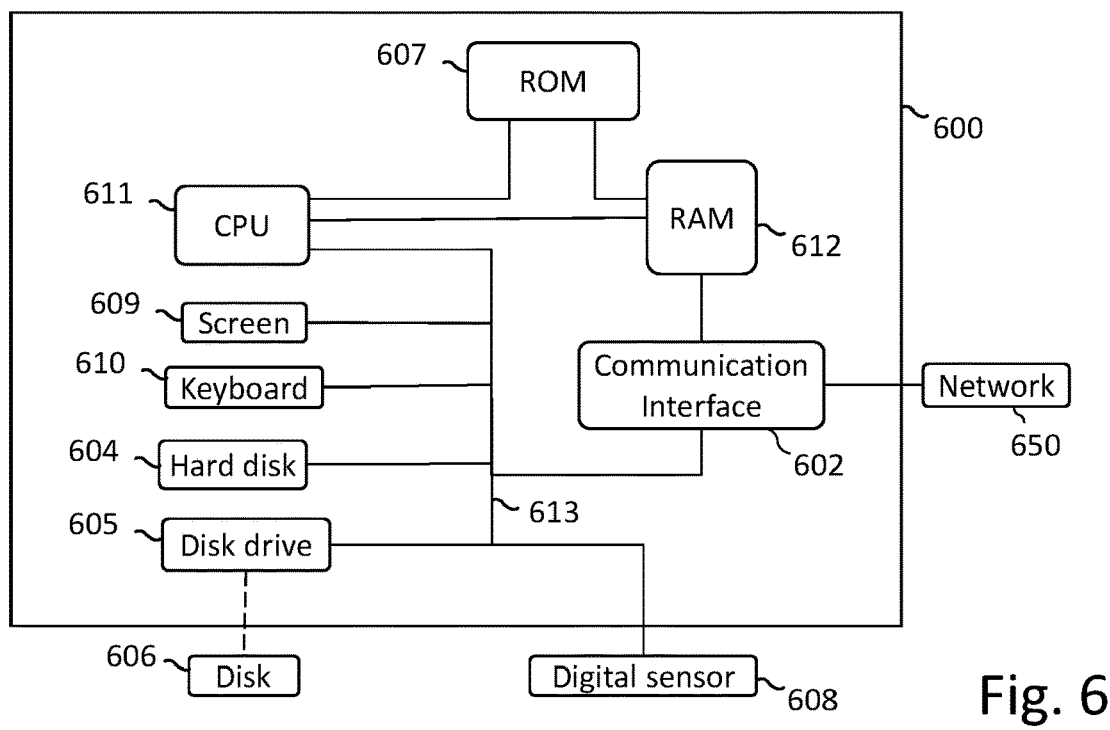
FIG. 6 is a schematic block diagram of a computing device for the implementation of one or more embodiments of the invention or of parts of the invention.

FIG. 6 is a schematic block diagram of a computing device for the implementation of one or more embodiments of the invention or of parts of the invention. Such a device may be one of the slave nodes 210, 220, and 230 of FIG. 2. For example, this device, referenced 600 in FIG. 6, may be a micro-computer, a workstation, or a light portable device. It comprises a communication bus 613 to which there are preferably connected:
  a central processing unit 611, such as a microprocessor, denoted CPU;
  a read only memory 607, denoted ROM, for storing computer programs for implementing the invention;
  a random access memory 612, denoted RAM, for storing the executable code of methods according to embodiments of the invention as well as the registers adapted to record variables and parameters necessary for implementing methods according to embodiments of the invention; and
  at least one communication interface 602 connected to the communication network 650 over which digital data packets or frames are transmitted, for example a communication network according to the 802.3 protocol. The data frames are written from a FIFO sending memory in RAM 612 to the network interface for transmission (egress FIFO) or are read from the network interface for reception and writing into a FIFO receiving memory in RAM 612 (ingress FIFO) under the control of a software application running in the CPU 611.

Optionally, the communication device 600 may also include the following components:
  a data storage means 604 such as a hard disk, for storing computer programs for implementing methods according to one or more embodiments of the invention;
  a disk drive 605 for a disk 606, the disk drive being adapted to read data from the disk 606 or to write data onto said disk;
  a screen 609 for displaying decoded data and/or serving as a graphical interface with the user, by means of a keyboard 610 or any other pointing means.

The communication device 600 can be connected to various peripherals, such as for example a digital sensor 608, each being connected to an input/output card (not shown) so as to supply data to the communication device 600.

The communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 607, on the hard disk 604 or on a removable digital medium such as for example a disk 606 as described previously. According to a variant, the executable code of the programs can be received by means of the communication network 650, via the interface 602, in order to be stored in one of the storage means of the communication device 600, such as the hard disk 604, before being executed.

The central processing unit 611 is adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 7:
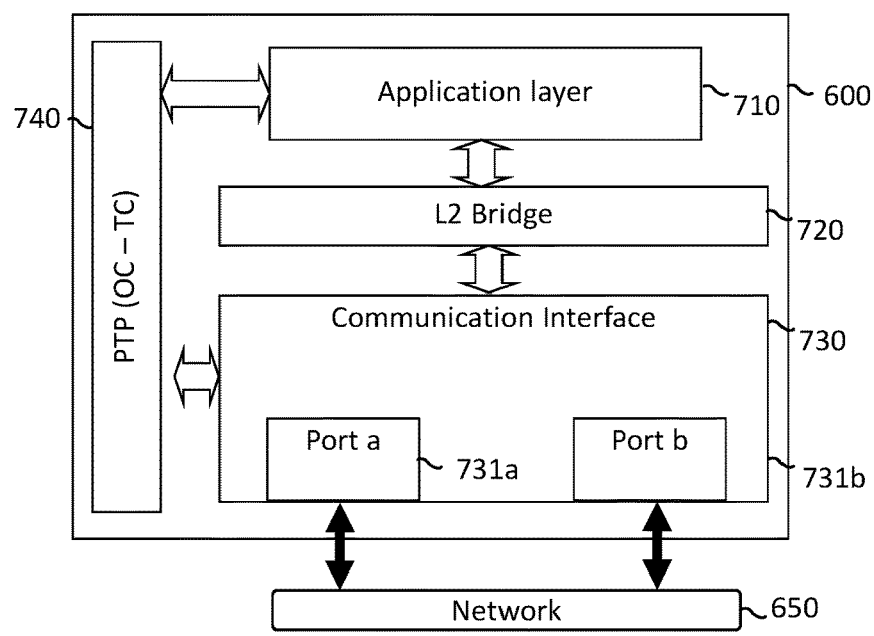
FIG. 7 is a block diagram schematically illustrating the architecture of a node adapted to carry out, at least partially, the invention, for example the device 600 in FIG. 6, according to a functional point of view.

FIG. 7 is a block diagram schematically illustrating the architecture of a node adapted to carry out, at least partially, the invention, for example the device 600 in FIG. 6, according to a functional point of view.

As illustrated, node 600 comprises a communication interface block referenced 730, an L2 bridge block referenced 720, a PTP block referenced 740, and an application layer block referenced 710.

According to the illustrated embodiment, communication interface block 730 (corresponding at least partially to reference 602 in FIG. 6) comprises two ports referenced 731a and 731b. The aim of this block is mainly to format and send or to receive frames over the communication network 650. It has the task of timestamping synchronization messages or packets and to supply the timestamps to Precision Time Protocol block 740.

L2 bridge block 720 is used to forward non PTP frames from one port to the other or to application layer 710.

According to particular embodiments, PTP block 740 comprises an ordinary clock module and a transparent clock module conforming to the specifications described in the IEEE 1588-2008 standard.

The PTP block 740 may be implemented in software, which software can be loaded into RAM (e.g. RAM 612 in FIG. 6) and executed by a CPU (e.g. CPU 611 in FIG. 6).

Application layer block 710 implements one or more applications that use the PTP time for example to generate a video, an audio clock, and/or to control sensors.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for synchronizing an ordinary clock module in a device for a node to be used in a system comprising cascaded nodes, during a synchronization phase of cascaded nodes of the system, the device comprising a physical clock, an input port, and an output port, the device further comprising the ordinary clock module and a transparent clock module, the ordinary clock module and the transparent clock module sharing the physical clock, the transparent clock module being configured for determining a residence time representing the time needed for a synchronization message received from the input port to be output via the output port, the method comprising:
  obtaining a theoretical residence time representing a theoretical time needed for a synchronization message received from the input port to be output via the output port, wherein the use of the theoretical residence time is based on a status of the system over a period of time;
  during a pre-synchronization phase according to which the ordinary clock module is not synchronized, adding a value representative of the obtained theoretical residence time to a residence time value stored in a synchronization message received during the pre-synchronization phase and to be forwarded,
  during the synchronization phase of cascaded nodes of the system, in a case where the ordinary clock module is synchronized, obtaining a residence time and adding a value representative of the obtained residence time to a residence time value stored in a synchronization message received during the synchronization phase and to be forwarded, and
  synchronizing the ordinary clock module as a function of the residence time value stored in the synchronization message received during the pre-synchronization phase or during the synchronization phase.

2. The method of claim 1, wherein the step of obtaining a theoretical residence time comprises a step of disabling synchronization of the ordinary clock module and a step of computing an average residence time.

3. The method of claim 2, wherein the average residence time is computed based on a predetermined number of processed received synchronization messages.

4. The method of claim 1, wherein the step of obtaining a theoretical residence time comprises a step of obtaining a predetermined theoretical residence time.

5. The method of claim 4, wherein the predetermined theoretical residence time is obtained as a function of an item of information directed to a workload of communication links connecting the cascaded nodes.

6. The method of claim 4, further comprising a step of computing a plurality of theoretical residence times, each theoretical residence time of the plurality of theoretical residence times being associated with particular communication conditions.

7. The method of claim 1, wherein the theoretical residence time is obtained from another node through a received message.

8. The method of claim 1, wherein a value representative of the obtained theoretical residence time is added to a residence time value of a received synchronization message for updating the received synchronization message that is forwarded afterward.

9. The method of claim 1, further comprising a step of updating the obtained theoretical residence time as a function of a computed residence time.

10. The method of claim 1, further comprising a step of comparing the obtained residence time with at least one threshold, wherein the value representative of the obtained theoretical residence time is added to a residence time value stored in a synchronization message to be forwarded, instead of a value representative of the obtained residence time, during the pre-synchronization phase, as a result of the comparison.

11. The method of claim 10, further comprising a step of updating the obtained theoretical residence time as a function of a computed residence time, wherein the step of updating the obtained theoretical residence time is carried out as a function of the comparison.

12. A non-transitory computer-readable storage medium storing instructions of a computer program for implementing the method according to claim 1.

13. A synchronization device for a node in a system comprising cascaded nodes, the synchronization device comprising a microprocessor, a physical clock, an input port, and an output port, the synchronization device further comprising an ordinary clock module and a transparent clock module, the ordinary clock module and the transparent clock module sharing the physical clock, the transparent clock module being configured for determining a residence time representing the time needed for a synchronization packet received from the input port to be transmitted via the output port, the microprocessor being configured for carrying out steps of synchronization of the ordinary clock module according to a master node clock, during a synchronization phase of cascaded nodes of the system, the steps of synchronization comprising:

obtaining a theoretical residence time representing a theoretical time needed for a synchronization message received from the input port to be output via the output port, wherein the use of the theoretical residence time is based on a status of the system over a period of time;

during a pre-synchronization phase according to which the ordinary clock module is not synchronized, adding a value representative of the obtained theoretical residence time to a residence time value stored in a synchronization message received during the pre-synchronization phase and to be forwarded, during the synchronization phase of cascaded nodes of the system, in a case where the ordinary clock module is synchronized, obtaining a residence time and adding a value representative of the obtained residence time to a residence time value stored in a synchronization message received during the synchronization phase and to be forwarded, and synchronizing the ordinary clock module as a function of the residence time value stored in the synchronization message received during the pre-synchronization phase or during the synchronization phase.

14. The synchronization device of claim 13, wherein the microprocessor is further configured so that the step of obtaining a theoretical residence time comprises a step of disabling synchronization of the ordinary clock module and a step of computing an average residence time.

15. The synchronization device of claim 14, wherein the microprocessor is further configured so that the average residence time is computed based on a predetermined number of processed received synchronization messages.

16. The synchronization device of claim 13, wherein the microprocessor is further configured so that the step of obtaining a theoretical residence time comprises a step of obtaining a predetermined theoretical residence time.

17. The synchronization device of claim 16, wherein the microprocessor is further configured for carrying out a step of computing a plurality of theoretical residence times, each theoretical residence time of the plurality of theoretical residence times being associated with particular communication conditions.

18. The synchronization device of claim 13, wherein the microprocessor is further configured so that the theoretical residence time is obtained from another node through a received message.

19. The synchronization device of claim 13, wherein the microprocessor is further configured so that a value representative of the obtained theoretical residence time is added to a residence time value of a synchronized message for updating the received synchronization message that is forwarded afterward.

20. The synchronization device of claim 13, wherein the microprocessor is further configured for carrying out a step of updating the obtained theoretical residence time as a function of a computed residence time.

21. The synchronization device of claim 20, wherein the microprocessor is further configured for carrying out a step of comparing the obtained residence time with at least one threshold, wherein the value representative of the obtained theoretical residence time is added to a residence time value stored in a synchronization message to be forwarded, instead of a value representative of the obtained residence time, during the pre-synchronization phase, as a result of the comparison.

22. The synchronization device of claim 21, wherein the microprocessor is further configured so that the step of updating the obtained theoretical residence time is carried out as a function of the comparison.

\* \* \* \* \*